United States Patent
Løngaa

(10) Patent No.: US 11,184,717 B2
(45) Date of Patent: Nov. 23, 2021

(54) NEAR FIELD MAGNETIC INDUCTION WIRELESS COMMUNICATION SYSTEM WITH DYNAMIC CHANGE OF TRANSMITTING POWER

(71) Applicant: GN HEARING A/S, Ballerup (DK)

(72) Inventor: Michael Løngaa, Farum (DK)

(73) Assignee: GN Hearing A/S, Ballerup (DK)

( * ) Notice: Subject to any disclaimer, the term of this patent is extended or adjusted under 35 U.S.C. 154(b) by 34 days.

(21) Appl. No.: 16/676,349

(22) Filed: Nov. 6, 2019

(65) Prior Publication Data
US 2020/0178005 A1 Jun. 4, 2020

(30) Foreign Application Priority Data
Nov. 26, 2018 (EP) ..................................... 18208322

(51) Int. Cl.
*H04R 25/00* (2006.01)
*H04B 5/00* (2006.01)

(52) U.S. Cl.
CPC ......... *H04R 25/554* (2013.01); *H04B 5/0037* (2013.01); *H04R 25/30* (2013.01); *H04R 25/558* (2013.01); *H04R 2225/55* (2013.01)

(58) Field of Classification Search
CPC ............ H04R 2225/49; H04R 2225/55; H04R 2225/51; H04R 2460/03; H04R 25/554; H04R 25/55
See application file for complete search history.

(56) References Cited

U.S. PATENT DOCUMENTS

| 2004/0190734 A1* | 9/2004 | Kates ................... H04R 25/356 381/106 |
| 2006/0280324 A1 | 12/2006 | Beck et al. |
| 2008/0031478 A1 | 2/2008 | Alber et al. |
| 2008/0226107 A1 | 9/2008 | Boguslavskij et al. |

(Continued)

FOREIGN PATENT DOCUMENTS

| EP | 2 211 579 A1 | 7/2010 |
| EP | 2 461 606 A1 | 6/2012 |

(Continued)

OTHER PUBLICATIONS

Extended European Search Report dated May 16, 2019 for corresponding EP Application No. 18208322.0.

(Continued)

*Primary Examiner* — Kile O Blair
(74) *Attorney, Agent, or Firm* — Vista IP Law Group, LLC

(57) ABSTRACT

A hearing device system includes at least three devices configured to communicate wirelessly via near field magnetic induction wireless link(s) based on a predetermined communication protocol; wherein the predetermined communication protocol defines a frame comprising at least a first time slot and a second time slot; wherein at least a first pair of devices of the at least three devices is configured to communicate in the first time slot, and at least a second pair of devices of the at least three devices is configured to communicate in the second time slot; and wherein the first pair of devices is configured to transmit in the first time slot with a first transmit power level, and the second pair of devices is configured to transmit in the second time slot with a second transmit power level that is different from the first transmit power level.

16 Claims, 7 Drawing Sheets

(56) References Cited

U.S. PATENT DOCUMENTS

| | | | | |
|---|---|---|---|---|
| 2010/0184383 A1* | 7/2010 | Lerke | ............ | H04R 25/552 |
| | | | | 455/66.1 |
| 2011/0286616 A1 | 11/2011 | Beck et al. | | |
| 2012/0140761 A1* | 6/2012 | Aerts | ............ | H04R 25/554 |
| | | | | 370/345 |
| 2013/0148831 A1 | 6/2013 | Andersen | | |
| 2015/0010179 A1* | 1/2015 | Solum | ............ | H04M 1/72412 |
| | | | | 381/315 |

FOREIGN PATENT DOCUMENTS

| | | |
|---|---|---|
| EP | 2 824 901 A1 | 1/2015 |
| EP | 2683333 B1 | 8/2016 |
| EP | 3113512 A1 | 1/2017 |

OTHER PUBLICATIONS

Extended European Search Report dated May 16, 2019 for corresponding European Application No. 18208322.0.

* cited by examiner

NEAR FIELD MAGNETIC INDUCTION WIRELESS COMMUNICATION SYSTEM WITH DYNAMIC CHANGE OF TRANSMITTING POWER

RELATED APPLICATION DATA

This application claims priority to, and the benefit of, European Patent Application No. 18208322.0 filed on Nov. 26, 2018. The entire disclosure of the above application is expressly incorporated by reference herein.

FIELD

The disclosure relates to hearing device systems. In particular, a hearing device system comprising spatially separate devices communicating via near field magnetic induction links and a corresponding communication method for a hearing device system.

BACKGROUND

Hearing device systems are generally well known. Hearing device systems may comprise hearing aid systems providing a hearing loss compensated sound into an ear canal of a user of the hearing aid systems.

Other examples for hearing device systems are headsets, which do not perform hearing loss compensation, but provide sound from a source device, for example a mobile phone or a radio receiver into the ear canal.

Radio device systems often comprise plural devices each with a separate housing and each device arranged at a distinct position of a user, especially arranged around the head of the user.

A hearing device system acting as a hearing aid system may comprises two devices worn behind a pinna of each ear of the user. These devices have a behind-the-ear (BTE) housing specifically shaped for wearing behind the pinna and accommodating electric components such as microphones, amplifiers and microcontrollers/signal processor for providing hearing loss compensation. Output transducers, such as a miniature loudspeaker or receiver, may be arranged in the outer ear canals as receiver-in-the-ear (RIE) feeding the hearing loss compensated sound into each ear canal of the user. These output transducers may be surrounded by a specifically shaped in-the-ear housing, earpiece shell or ear mould for insertion into the outer ear canal of the user.

Auxiliary devices providing for example interfaces for the hearing aid system to external devices are also known in the art. These external devices may include television sets, mobile phones, digital audio players, streaming devices, programming devices, test devices, external microphone arrays, etc., etc. Some auxiliary devices may be arranged in a so-called "piggy-back" housing accommodating the electronic circuitry providing the interface capability and being specifically adapted to mate to an end of the BTE housing of another device of the hearing device system. Such "piggy back" housing is often referred to as a "boot", "audio boot" or an "audio shoe".

Such modular system configuration is advantageous in terms of convenience to the user and offers further upgrade capabilities for the provider of the hearing device system.

The hearing device system comprising a plurality of devices and requires a communication capability between the plurality of devices. Some communication between devices is unidirectional, but some other devices even require a bidirectional communication.

Well known in the art is a direct communication via wire bound communication using an electrical cable, for example between a BTE housing and an in-the-ear housing, or physical connectors arranged directly adjacent at the BTE housing and an attached piggy back housing.

Nevertheless, physical connectors, in particular with a plurality of contacts, and external cabling require space, which add to manufacturing cost, and are susceptible to wear and damage. These problems aggregate with the number of individual devices and required inter-device communication links the hearing device system may comprise.

A known approach to improve communication between hearing aid devices is using wireless communication and in particular near field magnetic induction (NFMI). This approach is similar to the conventional induction loop. In a known hearing aid system, the two hearing aid devices of a binaural hearing aid system communicate via near field magnetic induction, providing the convenience of synchronized adjustments to memory of volume, as well as benefits of binaural signal processing between both hearing aid devices.

Typically, a communication protocol for the hearing device system using NFMI communication uses time division techniques for implementing a bidirectional communication between each pair of the individual devices. Each communication link between two devices assigns a time slot for a communication direction from a first device to a second device and vice versa. For each communication link between two devices two time slots are to be provided by the communication protocol. The number of required timeslots increases with the number of communication links between an increasing number of devices of the hearing device systems.

However, using time division multiplexing reduces the advantages of the modular approach as a communication bandwidth and accordingly a data rate for the individual communication channel between two devices decreases.

Therefore, the state of the art hearing device system constituted by a plurality of devices linked using inter-device communication links based on near field magnetic induction may be subject for improvement.

SUMMARY

The hearing device system according to independent claim 1 and the communication method for a hearing device system provides an advantageous solution to the problems described above described.

The dependent claims define further advantageous embodiments.

A hearing device system comprises at least three devices, in particular at least three devices two or more of the which are hearing aid devices, e.g. forming a binaural hearing aid system. The at least three devices are configured to communicate among one another wirelessly via a near field magnetic induction wireless link based on a predetermined communication protocol. The predetermined communication protocol defines a frame comprising at least a first time slot and a second time slot. At least a first pair of devices of the at least three devices is configured to communicate in the first time slot and at least a second pair of devices of the at least three devices is configured to communicate in the second time slot. The first pair of devices is configured to transmit in the first time slot with a first transmit power level and the second pair of devices is configured to transmit in the second time slot with a second transmit power level which is different to the first transmit power level.

In certain embodiments, one device of the at least three devices is comprised in both of the first pair of devices and the second pair of devices. In some of such embodiments, a first distance between the devices of the first pair of devices is greater than a second distance between the devices of the second pair of devices, when the hearing device system is worn by a user.

The devices of the first pair and the devices of the second pair may be configured to be used in a configuration where the first distance is greater than the second distance. This is for example the case when the first pair of devices is a pair of hearing aid devices configured to be worn in or at respective ears of a hearing aid user and when the second pair of devices comprises one of said hearing aids and an auxiliary devices associated with said one of said hearing aids, such as an audio shoe.

Furthermore, the first transmit power level is preferably greater than the second transmit power level. Furthermore, in some of such embodiments, the second transmit power level is preferably so weak, that it does not cause noticeable interference at distances around or longer than the first distance.

Some embodiments of the hearing device system comprises a first hearing aid device, a second hearing aid device, a first auxiliary device, such as a first audio shoe, adapted to communicate wirelessly with the first hearing aid device, and a second auxiliary device, such as a second audio shoe, adapted to communicate wirelessly with the second hearing aid device.

In some of such embodiments, the respective distances between the first hearing aid device and the first auxiliary device and the second hearing aid device and the second auxiliary device are shorter than a distance between the first and second hearing aid devices, when the hearing aid system is worn by a user. In some of such embodiments, the first pair of devices comprises the first and the second hearing aid devices and the second pair of devices comprises the first hearing aid device and the first auxiliary device. In some embodiments, a third pair of devices comprises the second hearing aid and the second auxiliary device. The third pair of devices is configured to transmit in the second time slot with a third transmit power level which is different to the first transmit power level. Each of the second and third transmit power levels is weaker than the first transmit power level. An advantage of the latter hearing device system is that the first and second hearing aid devices may communicate with each other in the first time slot using the first transmit power level and with their respective auxiliary devices in the second time slot using the second and third transmit power levels, while avoiding cross-talk between the two communication channels of the first hearing aid device and the first auxiliary device and in the second time slot as the second and third transmit power levels are too weak to cause substantial interference between the two communications channels.

Using different power levels for the near field magnetic induction wireless links between a first pair of devices and a second pair of devices enables the use of a suitable transmission power level, adapted to the spatial arrangement of the devices in question, when worn by a user, of the first pair of devices with respect to each other and the devices of the second pair of devices with respect to each other. Instead of the static transmission power level of the known near field magnetic induction wireless link between hearing aid devices, the claimed hearing device system allows using a reduced transmission power level in case a pair of devices is in close proximity. Thus, the power consumption of the inventive hearing device system is reduced when compared with the state of the art.

Furthermore, the present hearing device system has the additional benefit of allowing concurrent wireless near field magnetic induction communication on a same frequency on different near field magnetic induction wireless links because a reduced transmission power level, which is now possible, reduces or even eliminates interference and/or crosstalk between transmitters and receivers arranged at opposing sides of a user's head.

It is not required to use different frequencies for different communication channels as in frequency division multiplex multiple access systems which leads to a more efficient utilization of the available frequency spectrum. Hence, in an embodiment, the transmission in the first and second time slots may be carried out on the substantially same frequency, e.g. on the same frequency channel or frequency band. This feature allows the hearing device system to transmit on a frequency channel which is subjected to a minimum of interference and reflections from external sources, i.e. a current environment of the user and the user him/her-self, in both the first and second time slots. At the same time avoiding interference between the devices of the hearing device system due to the different transmit power levels.

Even more advantageous, envisaging more time slots in a communication protocol to ensure sufficient separation between different communication channels between different pairs of devices is not necessary, so that an increase in communication bandwidth and therefore data transfer rate between devices is achieved by the present hearing device system.

According to a preferred embodiment at least one first device of the at least three devices of the hearing device system comprises a control circuit. The control circuit is configured to select the first transmit power level and/or the second transmit power level based on received type identifiers of the at least two second devices of the at least three devices. Additionally or alternatively, the control circuit is configured to select the first transmit power level and/or the second transmit power level based on a dynamic evaluation of a communication link quality of the respective near field magnetic induction wireless link to each of the second devices of the at least three devices.

By exchanging device type identifiers between the first and the second devices, for example during an initial pairing session, a spatial arrangement of the devices of the hearing device system may be conveniently determined. Thereby, suitable transmission power levels for the required near field magnetic induction wireless links can be determined without more complex transmission quality measurements. Thus, the implementation costs of the hearing device system are advantageously low although the benefits over the state of art are fully realized.

The hearing device system according to an advantageous embodiment is characterized by the control circuit being configured to select the first transmit power level and/or the second transmit power level based on the dynamic evaluation of the communication link quality of the near field magnetic induction wireless link to each of the second devices of the at least three devices by computing the communication link quality of a communication signal received by the at least one first device from each of the at least two second devices.

Supervising the communication link quality may be performed dynamically and concurrently by monitoring the received communication signals on the near field magnetic induction wireless links. This enables online monitoring the actual quality of the communication and regarding the actual link quality for selecting a suitable transmission power in order to achieve an acceptable quality for each link without interfering with parallel links. An adaptive or dynamic adjustment of the transmission power levels during operation of the hearing device system becomes possible.

In a preferred embodiment of the hearing device system the control circuit is configured to increase the transmit power level in case the evaluated communication link quality falls below a predetermined minimum communication link quality.

Thus, a dynamic adaption of the transmission quality of each near field magnetic induction communication link quality even in case of sudden additional noise components in the communication channel is possible. On the other hand, the initially selected transmission power level needs not to take into account every possible additional noise source, which may or may not be encountered. Thus, an efficient power management of the hearing device system is possible. This is particularly advantageous in case of battery operated hearing device systems.

The electromagnetic interference (EMI) level in the surroundings of the hearing device system may suddenly increase, for example due to additional interfering RF noise sources and the communication link quality therefore deteriorate. However, the adaptive nature of the transmission power level selection according to some embodiments may respond by immediately adjusting, here raising the transmission power level, such that an acceptable communication link quality in achieved over the hearing device system.

A further advantageous embodiment of the hearing device system is characterized by the control circuit being configured to decrease the transmit power level in case the evaluated communication link quality exceeds a predetermined minimum communication link quality.

Thereby the first device may start communication session with a maximum or a high transmission power level and then gradually, for example stepwise, decrease the transmit power level until a minimum communication link quality threshold is reached. Thus, the finally selected transmission power level ensures a most efficient use of the available electric power. This is most advantageous in case of battery driven devices such as hearing device systems and hearing aid systems.

An advantageous control circuit of the embodiment of the hearing device system is configured to determine the communication link quality by calculating at least one of a packet error rate and a bit error rate of the communication signal received by the at least one first device from each of the at least two second devices via the near field magnetic induction wireless links.

By the control circuit determining a packet error rate, for example by using a cyclic redundancy checksum (CRC) code of received data packets or by performing bit error rate (BER) calculations, an effective assessment and evaluation of the communication link quality is possible.

In a further advantageous embodiment, the hearing device system is characterized by the control circuit exchanging with at least two second device respective device type identifiers in a pairing session via a first near field magnetic induction transceiver.

Exchanging device type identifiers in paring session is a highly efficient method of acquiring information on distances of the individual devices of the hearing device system. Therefore, suitable transmission power levels may be selected without complex measurements or evaluation of received communication signals or generation of specific sounding signals for measuring the properties of a communication channel of the near field magnetic induction wireless link.

The control circuit of a preferred embodiment of the hearing device system is configured to control the first near field magnetic induction transceiver to transmit during the pairing session an inquiry signal or a beacon signal, in particular with the first transmit power level. The first transmit power level is higher than the second transmit power level.

Advantageously, the hearing device system comprises the at least two second devices of the at least three devices configured to transmit a response signal comprising a device type identifier for a second device type when receiving the inquiry signal and/or the beacon signal.

Preferably one of the at least two second devices is an auxiliary device and comprises at least one of an external microphone arrangement, for example a neck-worn microphone system, a wireless receiver, a mobile telephone interface, a battery charging device, a remote control interface, an induction loop interface (telecoil) and a FM receiver device.

Auxiliary devices may be arranged at a predefined position with a respective relative distance and orientation to the other devices of the hearing device system. For example, the auxiliary device may be arranged directly adjacent to the first device, for example in a piggyback configuration with the first device, which may preferably be a hearing aid device. Thus, a significantly lower transmission power level will be sufficient compared to a transmission power level required for the near field magnetic induction wireless link between two monaural hearing (aid) devices arranged at a left and right ear of the user respectively. Therefore, the adaptively selectable transmission power levels are particularly advantageous in case of a hearing device system including auxiliary devices.

The hearing device system preferably includes the at least one first device being at least one of a monaural hearing aid device and a monaural headset. According to a second aspect, a hearing aid device for a hearing device system according to the first aspect addresses the objective technical problem.

The hearing aid device comprises a control circuit and a near field induction magnetic transceiver. The hearing aid device is configured to communicate via the near field induction magnetic transceiver according to a predetermined communication protocol. The predetermined communication protocol defines a frame comprising at least a first time slot and at least a second time slot. The control circuit is configured to control the near field induction magnetic transceiver to transmit a first transmission signal to a second device in the first time slot with the first transmit power level and a second transmission signal to a third device in the second time slot with a second transmit power level different to the first transmit power level.

A communication method for a hearing device system according to a third aspect shows the hearing system comprising at least three devices, wherein the at least three devices are configured to communicate with one another wirelessly via a near field magnetic induction wireless link based on a predetermined communication protocol. The predetermined communication protocol defines a frame system comprising at least a first time slot and a second time slot. The communication method comprises a step of a first pair of devices of the at least three devices communicating in the first time slot with a first transmit power level, and a step of a second pair of devices of the at least three devices communicating in the second time slot with a second transmit power level which is different to the first transmit power level.

The communication method for a hearing system according to the third aspect may be used for the hearing device system of the first aspect or the hearing aid device of the second aspect. Furthermore, the hearing device system of the first aspect may comprise a hearing aid device according to the second aspect.

BRIEF DESCRIPTION OF THE DRAWINGS

A system and a method according to various embodiments are discussed in more detail with reference to the figures, in which FIG. 1 provides an overview of a hearing system.

DETAILED DESCRIPTION OF THE DRAWINGS

Figure 1:
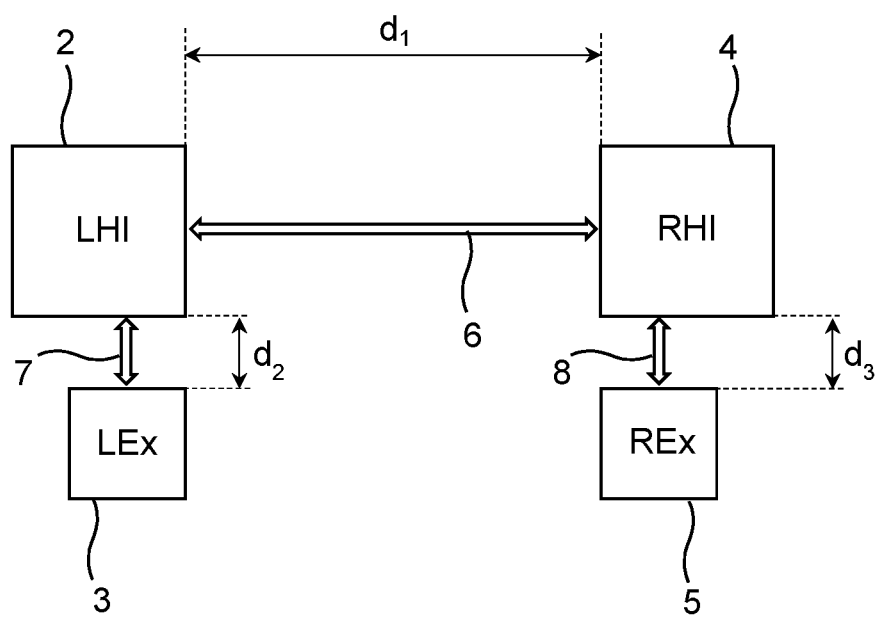

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the detailed description of the drawings of various examples and embodiments of the hearing device system and the corresponding communication method, same reference signs denote same or corresponding elements.

FIG. 1 provides an overview of a hearing device system 1. The depicted hearing device system 1 is mere example and comprises four separate devices 2, 3, 4, 5. Each of the devices 2, 3, 4, 5 has its own housing and is arranged at a distinct spatial position to each other device 2, 3, 4, 5.

The hearing device system 1 preferably is a hearing aid system. A first device 2 is a left hearing aid (LHI) arranged at a left ear of the user of the hearing device system 1. A second device 4 is a right hearing aid (RHI) arranged at a right ear of the user of the hearing device system 1.

A distance $d_1$ between the first device 2 and the second device 4 may therefore be about 0.17 m in a typical application scenario of the hearing device system 1.

The third device 3 and the fourth device 5 each may be auxiliary devices in a hearing aid system. For example, the third device 3 may be a wireless audio shoe, sometimes referred to as a wireless direct audio shoe (DAI), preferably arranged in a piggyback housing adjacent to housing of the first device 2. Thus, the third device 3 is placed significantly closer to the first device 2 than the second device 4.

A distance $d_2$ between the first device 2 and the third device 3 may therefore be about 0.01 m in a typical application scenario of the hearing device system 1.

The fourth device 5 may be a further auxiliary device in the hearing aid system. For example, the fourth device 5 may also be a wireless audio shoe, sometimes referred to as a wireless direct audio shoe (DAI) arranged in a piggyback housing adjacent to housing of second device 4. Thus, the fourth device 5 is placed significantly closer to the second device 4 than the first device 2.

A distance $d_3$ between the second device 4 and the fourth device 5 may therefore be about 0.01 m in a typical application scenario of the hearing device system 1.

Thus, a great difference between the distance $d_1$ on the one hand and the distances $d_2$, $d_3$ on the other hand exists in the application of a head mounted hearing aid device system 1. This difference between $d_1$ and $d_2$, $d_3$ may even amount to an order of magnitude or more.

FIG. 1 also depicts the necessary communication links 6, 7, 8 between the devices 2, 3, 4, 5. Each of the depicted communication links 6, 7, 8 is a bidirectional communication link enabling bidirectional communication between a pair of the devices 2, 3, 4, 5.

A first communication link 6 provides two communication channels for a bidirectional communication between the first device 2 and the second device 4. A second communication link 7 provides further two communication channels for a bidirectional communication between the first device 2 and the third device 3. A third communication link 7 provides yet further two communication channels for a bidirectional communication between the second device 4 and the fourth device 5.

Each communication link 6, 7, 8 between the devices 2, 3, 4, 5 are provided by first and second near field magnetic induction communication units of the devices 2, 3, 4, 5 not shown in FIG. 1. Each first and second near field magnetic induction communication units is connected to a corresponding near field magnetic induction antenna (not depicted in FIG. 1) for generating/sensing the magnetic near field used for transmitting/receiving data via a communication signal between first and second near field magnetic induction communication units.

The first and second antennas may be magnetic field antennas which are operatively connected with a respective one of the first and second near field magnetic induction communication units.

Near-field magnetic induction communication (NFMI) utilizes a not propagating magnetic field for communication between devices. The magnetic field antenna, for example a coil, in one device modulates a non-propagating magnetic field, which is received and sensed by means of the magnetic field antenna in another device.

NFMI communication systems differ from other types of wireless communication systems that perform so-called "far field"—communication wherein an antenna is used to generate and transmit an electromagnetic wave radiating outwardly into free space. The power density of the radiated electromagnetic wave decreases with distance to the antenna, namely proportional to the inverse of the distance to the second power ($1r^2$) or −20 dB per decade, which facilitates long-range communication; whereas a NFMI communication system performs so-called "near field" communication wherein transmission energy is contained within the localized magnetic field. The magnetic field energy does not radiate into free space. The power density of near field transmission decreases at a rate proportional to the inverse of the distance to the antenna to the sixth power/$1/r^6$) or −60 dB per decade. The crossover point between near field and far field resides at approximate the wavelength $\lambda$ divided by $2\pi$ at which point propagating energy from an fMRI communication systems conforms to the same propagation rules as any far field system, for example a power density of radiated energy decreases with distance to the second power; however, at the crossover point, the propagated energy levels of an NFMI communication systems are −40 dB to −60 dB lower than for an equivalent far field communication system.

Thus, NFMI communication systems have a short range, typically less than 2 m.

The standard modulation schemes used in typical RF communications, in particular amplitude modulation, phase modulation and frequency modulation can be used in NFMI communication systems.

Current commercial implementations of near field communication use as the most commonly carrier frequency a frequency of about 13.56 MHz and have a wavelength $\lambda$ of about 22.1 m.

A preferred monaural hearing device in an embodiment performs near field communication using carrier frequencies ranging from 1 MHz to 30 MHz.

Particularly preferred are carrier frequencies of 10.66 MHz, or 13.56 MHz, or 22.66 MHz, etc.

The NFMI field is transmitted through human tissue with very little absorption as opposed to RF electromagnetic waves, making an NFMI communication system particular suitable for communication between devices arranged at ears of a human user and therefore at opposite sides of the users head.

Each of the first and second magnetic field antennas may be embedded in multilayer printed circuit board (PCB) as disclosed in more detail in EP 3 324 650 A1.

Preferably, each of the first and second magnetic field antenna comprises a coil, preferably a coil with a magnetic core, preferably a ferrite core, for providing strong magnetic field with low loss and low cost.

Preferably, the first and second magnetic field antennas of the first and second housings are aligned for optimum reception of the magnetic field generated by one of the first and second magnetic field antennas and received by the other one of the first and second magnetic field antennas when the first and second housings are worn in the intended operational positions at the ears of the user for normal use of the monaural hearing device.

Each of the magnetic field antennas operating as a receiving magnetic field antenna outputs a signal of maximum magnitude in response to the received modulated magnetic field as compared to the corresponding output signal for any other orientation and position of the first and second magnetic field antennas in their respective first and second housings.

For example, the first and second magnetic field antennas may be positioned in the first and second housings respectively of the monaural hearing device. When the first and second housings are worn in their intended operational positions at the ears of the user for normal use of the monaural hearing device, a centre axis of the magnetic field generated by one of the first and second magnetic field antennas is parallel to a corresponding centre axis of the magnetic field generated by the other one of the first and second magnetic field antennas.

Preferably, for achieving optimum reception characteristics, the centre axis of the magnetic field generated by one of the first and second magnetic field antennas is coinciding with the corresponding centre axis of the magnetic field generated by the other one of the first and second magnetic field antennas.

For example, the first and second magnetic field antennas may comprise first and second coils and first and second magnetic cores, respectively, for providing a strong magnetic field.

The first and second coils with the first and second magnetic cores may be positioned in the first and second housings, respectively, so that, when the first and second housings are in their intended operational positions at, or in, the ears of the user for normal use of the monaural hearing device, a centre axis of the first magnetic core is parallel to, and preferably for optimum reception coincides with, a corresponding centre axis of the second magnetic core.

The first and second magnetic cores may be ferrite cores.

The first near field magnetic induction communication unit connected to the first magnetic field antenna may also be used for field wireless communication with another device, for example for ear-to-ear communication, for example near field wireless communication between two monaural hearing devices worn on opposite sides of the head of the user.

The near field wireless communication may be performed in a near field wireless communication network.

The monaural hearing device may advantageously be incorporated into a binaural hearing system, wherein two monaural hearing devices are interconnected utilizing NFMI communication for digital exchange of data, such as digitally encoded audio signals, signal processing parameters, control data, such as identification of signal processing programs etc., and optionally interconnected with other devices, such as a remote control, etc.

Therefore, a binaural hearing system is provided with a first monaural hearing device and a second monaural hearing device, wherein each of the first and second monaural hearing devices has the first near field magnetic induction communication unit connected to the first magnetic field antenna, and during each of the first near field magnetic induction communication unit connected to the respective first magnetic field antenna, is adapted for performing ear-to-ear communication, for example near field wireless data communication between the first and the second monaural hearing devices of the binaural hearing system.

One of, or alternatively both of the first and second monaural hearing devices have the second housing.

Figure 2:
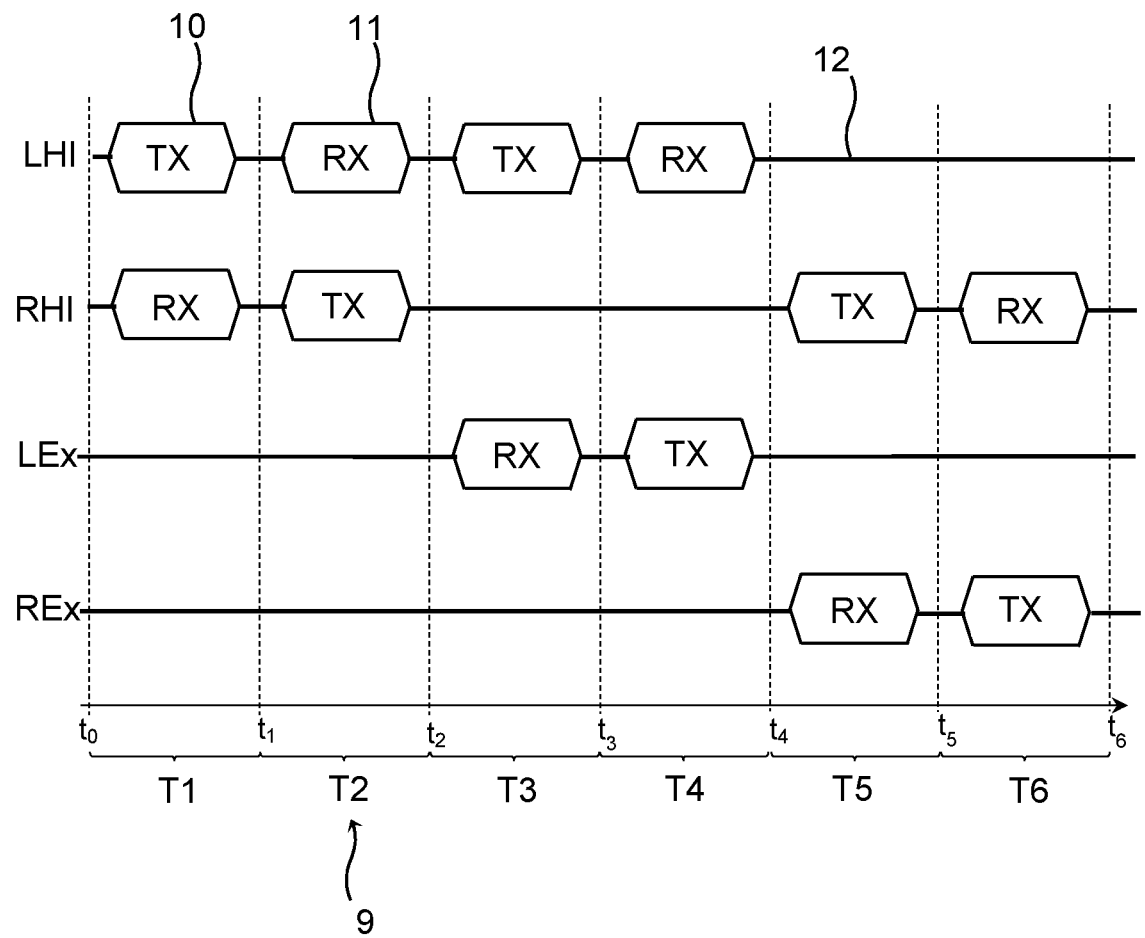
FIG. 2 shows a time chart for a time division multiple access scheme for a known hearing system.

FIG. 2 shows a time chart for a communication scheme for the known hearing system 1.

FIG. 2 depicts one time frame (period, frame) of a predetermined communication protocol. The predetermined communication protocol is used for communication between the individual devices 2, 3, 4, 5 of the hearing system 1 as shown in FIG. 1.

The frame is an entity for a time-division multiple access system where one of the devices may transmit during one or more time slots, receive during at least one other time slot, or neither transmit nor receive during one or more time slots.

The time chart shown in FIG. 2 depicts a single frame of the communication protocol, which enable communication between the devices of the hearing system of FIG. 1. The frame comprises six time slots 9 numbered sequentially as timeslots T1 to T6. In order to implement the bidirectional communication links 6, 7, 8 between the devices 2, 3, 4, 5 of the hearing system 1, the frame comprises the six timeslots 9. FIG. 2 shows for each device 2, 3, 4, 5, if the device 2, 3, 4, 5 may transmit data, the device 2, 3, 4, 5 may receive data or neither transmits nor receives data.

During timeslot T1, which ranges from time to to time $t_1$, FIG. 2 shows the first device 2 in a transmitting state 10. In the transmitting state 10, the near field magnetic induction communication unit of the first device 2 may transmit data to the second device 4. Thus, the second device 4, in particular its near field magnetic induction communication unit is in a receiving state during the first time slot T1. The near field magnetic induction communication units of the other devices 3, 5 of the hearing system 1 are in an inactive state 12 during the timeslot T1.

During timeslot T2, which ranges from time $t_1$ to time $t_2$, FIG. 2 shows the first device 2 in a receiving state 11. In the receiving state 11, the near field magnetic induction communication unit of the first device 2 may receive data transmitted by the near field magnetic induction communication unit of the second device 4. The near field magnetic induction communication unit of the second device 4 is thus in the transmitting state 10 during the second timeslot T2. The near field magnetic induction communication units of the other devices 3, 5 of the hearing system 1 are in an inactive state 12 during the timeslot T2.

Thus, the timeslots T1, T2 enable a bidirectional communication between the first device 2 and the second device 3.

In an entirely corresponding manner, the timeslots T3 and T4 of the depicted frame in FIG. 2 are reserved for a bidirectional communication link 7 between the first device 2 and the third device 3 of the hearing system 1.

In an entirely corresponding manner, the timeslots T5 and T6 of the depicted frame in FIG. 2 are reserved for a bidirectional communication link 8 between the second device 4 and the fourth device 5 of the hearing system 1.

The six timeslots 9 of the frame of the predetermined communication protocol implement a time division multiple access (TDMA) communication system with bidirectional communication links 6, 7, 8 in time duplex (TD) between pairs of devices 2, 3, 4, 5 (peer-to-peer communication) of the hearing system 1.

Figure 3:
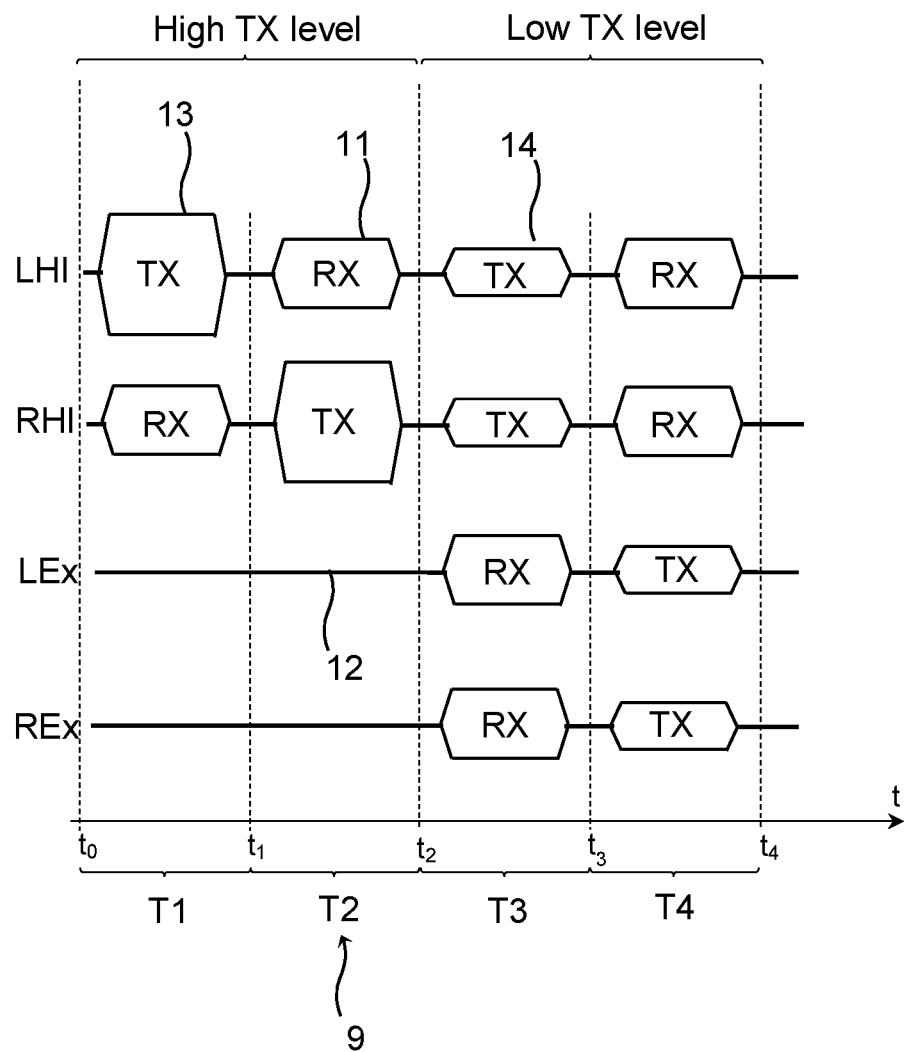
FIG. 3 depicts a time chart for a time division multiple access scheme of a hearing system according to an embodiment.

FIG. 3 depicts a time chart for a time division multiple access scheme of a hearing system 1 according to an embodiment.

The near field magnetic induction communication units of the devices 2, 3, 4, 5 according to an embodiment of the inventive hearing system 1 are capable to transmit data in a transmission signal at at least a first transmit power level or a second transmit power level.

Preferably the near field magnetic induction communication unit may transmit data in transmission signals at a plurality of discrete transmit power levels or emit transmission signals with a continuously variable transmit power level in a wide range of transmit power.

FIG. 3 depicts a single frame (period) of the predetermined communication protocol according to an embodiment, which enables communication between the devices 2, 3, 4, 5 of the hearing system of FIG. 1. The frame comprises only four time slots 9 numbered sequentially as timeslots T1 to T4. In order to implement the bidirectional communication links 6, 7, 8 between the devices 2, 3, 4, 5 of the inventive hearing system 1, the frame comprises the four timeslots 9. FIG. 3 shows for each device 2, 3, 4, 5 if the device 2, 3, 4, 5 may transmit data with a first transmit power level, if the device 2, 3, 4, 5 may transmit data with a second transmit power level, if the device 2, 3, 4, 5 may receive data or if the device 2, 3, 4, 5 neither transmits nor receives data.

During timeslot T1, which ranges from time to to time $t_1$, FIG. 3 shows the first device 2 in a first transmitting state 13. In the first transmitting state 13, the near field magnetic induction communication unit of the first device 2 may transmit data to the second device 4 in a transmission signal at a first transmit power level. Thus, the second device 4, in particular its near field magnetic induction communication unit is in the receiving state 11 during the first time slot T1. The near field magnetic induction communication units of the other devices 3, 5 of the hearing system 1 are in an inactive state 12 during the timeslot T1.

During timeslot T2, which ranges from time $t_1$ to time $t_2$, FIG. 2 shows the first device 2 in the receiving state 11. In the receiving state 11, the near field magnetic induction communication unit of the first device 2 may receive data transmitted by the near field magnetic induction communication unit of the second device 4. The near field magnetic induction communication unit of the second device 4 is thus in the first transmitting state 13 during the second timeslot T2.

The near field magnetic induction communication units of the other devices 3, 5 of the hearing system 1 are in an inactive state 12 during the timeslot T2.

Thus, the timeslots T1, T2 enable a bidirectional communication between the first device 2 and the second device 3.

The near field magnetic induction communication units of the first device 2 and the second device 4 respectively emit transmission signals at a first transmission power level.

During timeslot T3, which ranges from time $t_2$ to time $t_3$, FIG. 3 shows the first device 2 in a second transmitting state 14. In the second transmitting state 14, the near field magnetic induction communication unit of the first device 2 may transmit data to the third device 3 in a transmission signal at a second transmit power level. Thus, the third device 3, in particular its near field magnetic induction communication unit is in the receiving state 11 during the third time slot T3.

The example of FIG. 1 and FIG. 3 shows the second transmission power level to be lower than the first transmission power level. The spatial distance $d_1$ between the first device 2 and the second device 4 on the one hand is larger, in particular significantly larger, than the spatial distance d2 between the first device 2 and the third device 3 on the other hand.

Therefore, the near field communication between the first device 2 and the third device 3 does not interfere with the second device 4 and the fourth device 5.

During timeslot T3, the second device 4 is in the second transmitting state 14. The near field magnetic induction communication unit of the second device 2 may transmit data to the fourth device 5 in a transmission signal at the second transmit power level. Thus, the fourth device 5, in particular its near field magnetic induction communication unit, is in the receiving state 11 or mode during the third time slot T3.

Therefore, the near field communication between the second device 4 and the fourth device 5 does not interfere with the first device 2 and the third device 3.

Therefore, the near field communication between the first device 2 and the third device 3 does not interfere with the second device 4 and the fourth device 5.

During timeslot T4, the second device 4 is in the receiving state 11. The near field magnetic induction communication unit of the fourth device 5 may transmit data to the second device 4 in a transmission signal at the second transmit power level. Thus, the fourth device 5, in particular its near field magnetic induction communication unit, is in the second transmitting state 14 state 11 during the fourth time slot T4.

As the second transmitting state 14 only involves transmitting the second transmission power level which lower than the first transmitting power level and the distance $d_1$ between the first and second devices 2, 4 on the one hand is larger than the distance $d_3$ between the second and fourth devices 4, 5 on the other hand, the near field communication between the second device 4 and the fourth device 5 does not interfere with the first device 2 and the third device 3.

Figure 4:
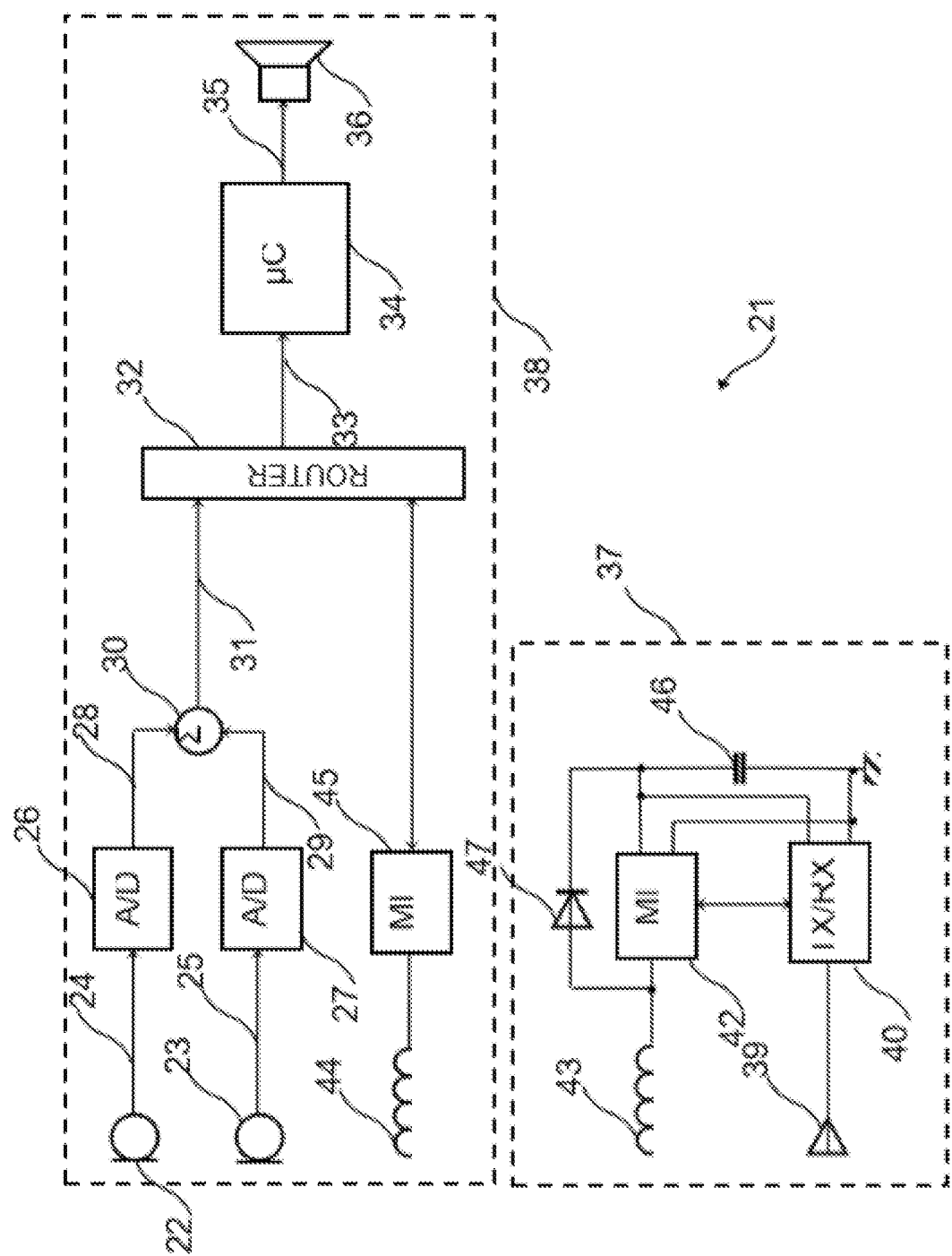
FIG. 4 shows a simplified block diagram of a hearing device according to an embodiment.

FIG. 4 shows a simplified block diagram of a hearing aid device 2, 3, 4, 5 according to an embodiment of the hearing system 1.

The block diagram shown in FIG. 4 in particular depicts electronic circuitry 21 of the hearing aid devices shown in FIG. 1.

The depicted hearing device circuitry 21 comprises a front microphone 22 and a rear microphone 23. The front microphone 22 and the rear microphone 23 convert an acoustic sound signal from the surroundings of the hearing device system 1 into corresponding microphone audio signals 24, 25 output by the front and rear microphones 22, 23. The microphone audio signals 24, 25 are fed to respective A/D converters 26, 27 for conversion of the microphone audio signals 24, 25 in two respective digital microphone audio signals 28, 29. The digital microphone audio signals 28, 29 are optionally pre-filtered, wherein the pre-filters are not depicted in FIG. 4, and combine in a succeeding signal combiner 30. The signal combiner 30 may, for example, form and output a digital microphone audio signal 31 with directionality as is well known in the art of hearing aid systems. The digital microphone audio signal 31 is input to a signal router 32. The signal router 32 is configured to output a weighted sum signal 33 based on a weighted sum of signals input to the signal router 32. The weighted sum signal 33 output by the signal router 32 is then applied to a hearing loss processor 34 configured to generate a hearing loss compensated output signal 35 based on the signal router output signal 33. The hearing loss compensated output signal 35 is applied to an output transducer 36, for example a miniature loudspeaker speaker or receiver, for conversion into acoustic sound for transmission into the user's ear canal and to the ear drum.

The depicted hearing device circuitry 21 is further configured to receive data, including control signals and digital audio signals from various transmitters, such as mobile phones, smart phones, desktop computers, tablet computers, laptop computers, radios, media players, companion microphones, broadcasting systems such as installed in public places s like churches, an auditorium, a theatre, a cinema, etc., public address systems, such as a railway station, in airport, a shopping mall, etc.

In the embodiment illustrated in FIG. 4, it is possible for another device to transmit data including digital audio signals wirelessly to the hearing device 21 via the second housing 37 that is removably attached to the first housing 38. The latter housing 38 comprises in particular components of the hearing device circuitry 21 such as the front microphone 22, the rear microphone 23, the A/D converters 26, 27, the signal combiner 30, the signal router 32, the hearing loss processor 34 and the output transducer 36.

The second housing 37 may in particular accommodate an RF-antenna 39 and a wireless transceiver 40 that is connected to the RF-antenna 39. The wireless transceiver 40 extracts and decodes digital data received from a signal received from RF antenna 39, for example including digital audio representing a stereo audio signal or a mono audio signal. The second housing 37 also accommodates a second near field magnetic induction communication unit 42 that is configured to modulate the signal received by the RF antenna 39 into a modulated signal suitable for transmission via the a second magnetic field antenna 43 in such a way that the second magnetic field antenna 43 emits a local, not propagating magnetic field for reception by the corresponding first magnetic field antenna 44 accommodated by the first housing 38 and also comprising a coil wound around a ferrite core. Centre axis of the transmitting and receiving magnetic field antennas 43, 44 are aligned in parallel for optimal, or substantially optimal, reception when the second housing 37 is attached to the first housing 38 in ins intended operational position. The first housing 38 also accommodates a first near field magnetic induction communication unit 45 that is connected to the first magnetic field antenna 44, and retrieves the digital data from the signal received from the first magnetic field antenna 44, including the digital audio representing the stereo audio signal or the mono audio signal and forward it to the signal router 32 to include the digital audio of the stereo channel or the mono audio signal in the audio signal 33 that is input to the hearing loss processor 34 for hearing loss compensation.

The signal router 32 is also configured to route the stereo channel or the mono audio signal intended from a further hearing aid device not shown in FIG. 4. Worn at the other ear of the user to the first near field magnetic induction communication unit 45 that modulates the digital audio of the stereo channel in question or the mono audio signal into a modulated signal suitable for transmission while the first magnetic field antenna 44 that emits a local, not propagating magnetic field in the direction of the other hearing aid device not shown, for example with field lines aligned with the ferrite core of the second magnetic field antenna 43 in the first housing 37 of the other hearing aid device for optimum, or substantially optimum, reception when both hearing aid devices are worn in the operational positions at the respective ears of the user during normal operational use. This is obtained by positioning the ferrite cores of the magnetic field antennas with the longitudinal axis aligned in parallel, and preferably coinciding, when both monaural hearing aid devices are worn in their intended operational positions at the respective ears of the user during normal operational use.

The other monaural hearing aid device may have the same circuitry arrangement accommodated in its respective first housing 37 as shown in FIG. 4, wherein the first magnetic field antenna 44 receives the modulated magnetic field and converts it into a corresponding voltage or current that is applied to an input the first near field magnetic induction communication unit 45. The first near field magnetic induction communication unit 45 is configured to modulate the digital audio of the stereo channel or the mono audio signal and forwards it to the signal router 32. The signal router 32 may include the digital audio of the stereo channel or the mono audio signal in the signal router output signal 33 that is transmitted to the hearing loss processor 34 for hearing loss compensation processing.

In this way, the digital audio of the stereo channel the mono audio signal for the other ear is transmitted to the monaural hearing aid device at the other ear with only little attenuation on its transmission path. The digital audio may include audio signals from a variety of sources and thus, the digital audio may form a plurality of input signals for the signal router 32, in particular one input signal for each source of audio.

In the event of receipt of digital audio by that RF antenna 39, the digital audio may be transmitted to the user while the digital microphone audio signal 31 is attenuated during transmission of the digital audio. The digital microphone audio signal 31 may also be muted. The user may enter, through the user interface of the monaural hearing aid device of a type well known in the art, controlling whether the digital microphone audio signal 31 is muted, attenuated, or remains unchanged.

The second housing 37 of the illustrated auxiliary device also accommodates a rechargeable energy storage device, for example in the form of a capacitor 46, for supplying power to electronic components such as the wireless transceiver 40 and the second near field magnetic induction communication unit 42 of the electronic circuit 21 accommodated by the second housing 37. The capacitor 46 is recharged by energy received by the second magnetic field antenna 43 and supplied to the capacitor 46 via a diode 47.

The first near field magnetic induction communication unit 45 forwards a high-frequency signal, preferably a carrier signal, for example with a frequency of 10.66 MHz or 22.66 MHz, to the first magnetic field antenna 44 for transmission to the second magnetic field antenna 43 for recharging the capacitor 46 or any other rechargeable storage device.

Additionally or alternatively, the electric circuitry accommodated by the second housing 37 is powered by a battery not shown in FIG. 4.

The electric circuitry accommodated by the first housing 38 is, for example, powered by battery also not shown in FIG. 4.

Figure 5:
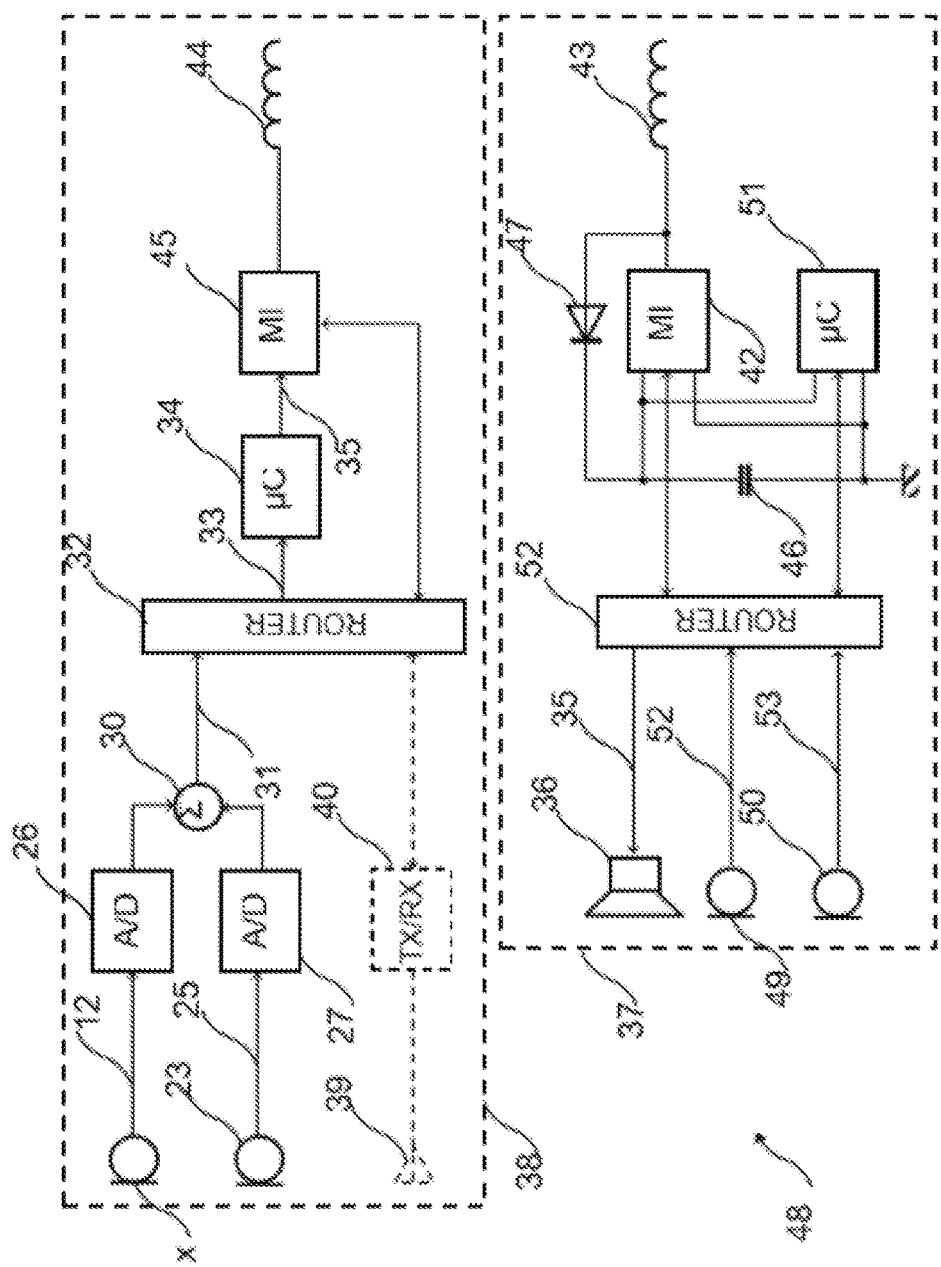
FIG. 5 shows a simplified block diagram of another hearing device according to an embodiment, and FIG. 6 provides a flowchart of a communication method for a hearing device system according to an embodiment, and FIG. 7 provides a flowchart of a communication method for a hearing device system according to another embodiment.

FIG. 5 shows a simplified block diagram of another hearing device 48 in an embodiment of the hearing aid system. The block diagram shows in particular the electronic circuitry of another monaural hearing aid in the form of an RIE hearing aid whose second housing 37 is the housing of an earpiece.

The earpiece of the illustrated monaural hearing aid device is similar to the earpiece of the RIE hearing aid device disclosed in EP 3 101 917 A1 except for the fact that in the new monaural hearing aid device, the connectors, conductors and the cable of the wired interface disclosed in EP 3 101 917 A1 for interconnecting the earpiece with electronic circuitry of the BTE housing, have been substituted by a near field wireless interface comprising the first near field magnetic induction communication unit 45 and the first magnetic field antenna 44 accommodated by the first housing 60 and the second near field magnetic induction communication unit 42 and the second magnetic field antenna 43 accommodated by the earpiece housing 37 for performing near field wireless data communication with the first magnetic field antenna 44 in a way similar to the wireless interface of their electronic circuitry depicted in FIG. 4.

The new monaural hearing aid 48 shown in FIG. 5 comprises a first housing 38 in the form of a BTE housing 38 adapted to be worn behind a pinna of a user of the hearing aid 48 not shown in FIG. 5. The first housing 38 accommodates electronic circuitry similar to the electronic circuitry of the housing 38 depicted in FIG. 4 apart from the fact that the output transducer 36 has been moved from the first housing 38 to the second housing 37 of the earpiece.

As in the electronic circuitry shown in FIG. 4 of the first housing 38, the first housing 38 accommodates a first near field magnetic induction communication unit 45 and the first magnetic field antenna 44 that is connected to the first near field magnetic induction communication unit 45 for performing near field wireless data communication. However, in the electronic circuitry depicted in FIG. 5, the hearing loss compensated output signal is input to the first near field magnetic induction communication unit 45 and transmitted wirelessly to the earpiece for transmission to the output device 36 via the second near field magnetic field antenna 43 and the first near field magnetic induction communication unit 42 accommodated in the earpiece respective its second housing 37.

In the same way as shown in FIG. 4, electronic circuitry may also be included in the electronic circuitry of the first housing 38 of FIG. 5 as illustrated by optional components, for example an RF antenna 39 connected with a wireless transceiver 40, drawn with dashed lines in FIG. 5.

Therefore, the monaural hearing aid device further comprises a second housing 37 in the form of the housing 37 of an earpiece. The housing 37 of the earpiece accommodates the second near field magnetic induction communication unit 42 and the second magnetic field antenna 43 that is connected to the second near field magnetic induction communication unit 42 for performing near field wireless data communication with the first magnetic field antenna 44 and the first near field magnetic induction communication unit 45.

The second housing 37 of the earpiece also accommodates microphones 49, 50 and a microcontroller 51 with a non-volatile memory for storing data relating to a configuration of the earpiece as disclosed in EP 3 101 917 A1.

The output device 36, the microphones 49, 50 and the microcontroller 51 shown in FIG. 5 respond to the output device 36, microphones 26, 66 and the microcontroller 40, respectively, shown in FIG. 4 of EP 3 101 917 A1 and the output device 36, the microphones 49, 50 and the microcontroller 51 operate in the same way as disclosed in EP 3 101 917 A1.

Signal router 50 routes signals from the second near field magnetic induction communication unit 42 to the output device 36 and from the microphones 49, 52 the second near field magnetic induction communication unit 42, and between the microcontroller 51 and the second near field magnetic induction communication unit 42 as required.

The second housing 37 also accommodates a rechargeable energy storage device in the form of a capacitor 46 for supplying power to electronic components such as the microcontroller 51 and the second near field magnetic induction communication unit 42 of the electronic circuit accommodated in the second housing 37. The capacitor 46 is recharged by energy received by the second magnetic field antenna 43 and supplied to the capacitor 46 through the diode 47.

The first near field magnetic induction communication unit 45 forwards a high frequency signal, preferably the carrier signal, for example with the frequency of 10.66 MHz or 22.66 MHz, to the first magnetic field antenna 44 for transmission to the second magnetic field antenna 43 for recharging the capacitor 46.

Alternatively or additionally, a battery not shown in FIG. 5 powers the electronic circuitry accommodated by the second housing 37.

The electronic circuitry accommodated by the first housing 38, for example the BTE housing 38, is powered by a battery also not shown in FIG. 5.

Figure 6:
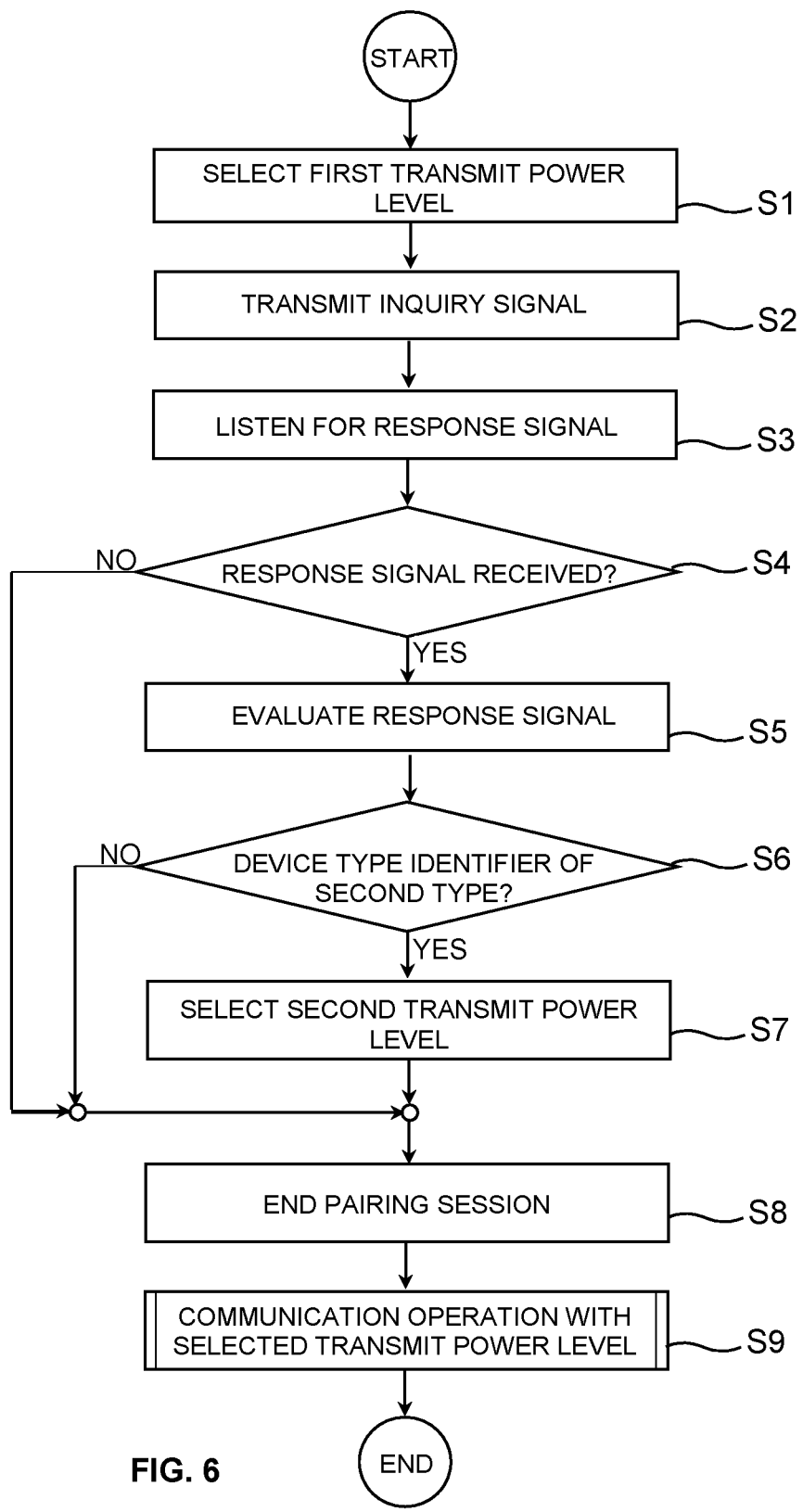

FIG. 6 provides a flowchart of a communication method for the hearing system 1 according to an embodiment. The communication method of FIG. 6 in particular provides an example for an initial pairing procedure. The pairing procedure may be performed for example when switching on power of a first device 2 of the hearing device system 1.

Alternatively or additionally, the pairing procedure may run in response to a corresponding user input via a user interface of the hearing device system 1.

Preferably, the method steps of the communication method are executed by a control circuit, in particular a microcontroller circuit or on a digital signal processor (DSP) of the first device 2, which is for example a hearing aid device.

After starting the first device 2, the control circuit selects a first transmit power level in step S1. The first power level is a high transmit power level for a transmission signal emitted by the near field magnetic induction system.

The high power is preferably the highest transmit power level of a plurality of available transmit power levels.

In step S2, the first device 2 transmits an inquiry signal with the first power level. The inquiry signal may for example include a first device type identifier. The first device type identifier unambiguously identifies a device type of the first device 2.

For example, the first device type identifier denotes the first device 2 as a hearing aid device in a BTE housing with a specific configuration, in particular a specific electric circuit configuration.

In step S3 succeeding to step S2, the first device enters into a listening state. In the listening state, the first device, in particular its near field magnetic induction transceiver, is adapted to receive near field magnetic induction signals emitted from other devices magnetically coupled to a near field magnetic induction antenna of the first device.

If in step S4, the near field magnetic induction transceiver receives determines that response signal has been received, the pairing procedure continues in step S5 with evaluating the received response signal.

Evaluating the response signal may in particular include extracting a device type identifier of a third device 3 transmitting the response signal in response to receiving the inquiry signal. The received device type identifier unambiguously identifies a device type of the third device 3.

For example, the device type identifier of the third device 3 denotes an auxiliary device in a piggy-back housing comprising specific electric circuitry, for example comprising a wireless interface, possibly providing a wireless Bluetooth™ interface.

In step S6, the first device 2, in particular its control circuit determines which device type identifier is included in the at least one received response signal. If, for example the device type identifier in the received response signal is of the second type (YES in step S6), the pairing procedure continues with step S7 and selects a second transmit power level. In particular the first device 2 will select the second transmit power level for transmitting signals via the near field magnetic induction transceiver of the first device 2 to the third device 3.

In case of the example in which the first device 2 is a hearing aid device in the BTE housing and the third device 3 being an auxiliary device in the piggy-back housing, the first device 2 adjusts a transmit power level second transmit power level of the near field magnetic induction transceiver from the first power level to the lower second power level during a time slot of the frame of the predetermined transmission protocol, which is assigned for transmitting data in a transmission signal form the first device 2 to the third device 3.

In subsequent step S8, the pairing procedure ends and the first device 2 continues to step S9. In step S9, the hearing device system 1 comprising the first device 2 and the third device 3 operates in a conventional manner, in which, however, the first device 2 transmits to the third device 3 with an adjusted transmit power level, in the discussed example with the second transmit power level lower than the first transmit power level.

If in step S4, the first device 2 determines that no response signal has been received during step S3, the pairing procedure directly to step S8 and ends the pairing procedure.

If in step S6, the first device 2 determines that no response signal has been received during step S3, the pairing procedure proceeds to step S8 and ends the pairing procedure. The first transmit power level selected in step S1 as the first transmit power level then remains the selected transmit power level.

It is evident, that in step S6, the received device type identifier may be tested for compliance with a plurality of different device type identifiers. The respective transmit power level may then be selected corresponding to step S7 from two or more different power levels based on the result of the determination in step S8.

The communication operation in step S9 may use the selected transmit power level from the pairing procedure discussed with reference steps S1 to S8. Additionally or alternatively, the communication operation in step S9 may include a further procedure which allows to continuously adapt the selected transmit power level during communication operation.

Figure 7:
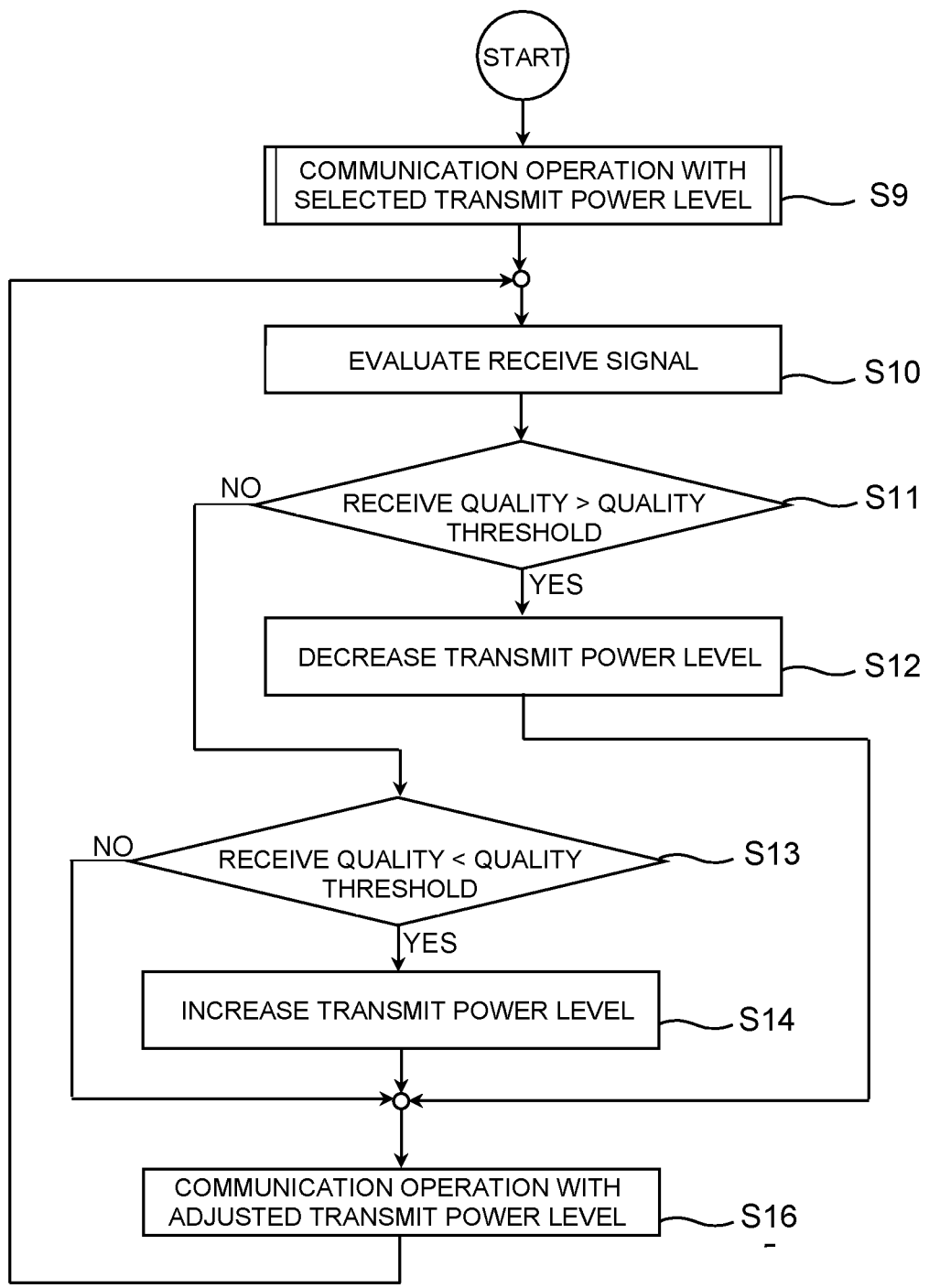

FIG. 7 provides a simplified flowchart of a communication method of continuously adapting the selected transmit power level during communication operation for a hearing device system 1 according to the preferred embodiment.

The procedure for adapting the selected transmit power level of FIG. 7 may be performed at regular intervals during communication operation of the hearing device system 1. In particular, the procedure for adapting the selected transmit power level may be performed at intervals for each time slot of the predetermined communication protocol used for near field magnetic induction communication between the devices 2, 3, 4, 5 of the hearing device system 1.

In step S9, the hearing device system 1 including the devices 2, 3, 4, 5 performs communication operation using the selected transmit power level from the pairing procedure discussed with reference steps S1 to S8. Additionally or alternatively, the hearing device system 1 starts operation between all devices with a maximum transmit power level for transmit operation of the near field magnetic induction transceivers in the devices 2, 3, 4, 5.

In step S10, the first device 2 evaluates a receive signal received in the near field magnetic induction transceiver from a second device 4 in the respective time slot 9.

In particular, a control circuit of the first device 2 may compute a packet error rate PER based on a CRC checksum of received data packets of the received signal. Additionally or alternatively, the control circuit may compute a bit error rate BER from data bits received in the received signal. The control circuit may then determine a receive quality as a link quality measure for the near field magnetic induction link from the second device 4 to the first device 2 based on the computed PER and/or BER in step S10.

The determined link quality measure from step S10 is then compared to a quality threshold in step S11. The quality threshold may be a pre-set or a selectable threshold value, which defines a minimum transmission link quality for ensuring a required minimum data rate for the near field magnetic induction communication link between the first device 2 and the second device 4. If the determined link quality measure exceeds the quality threshold in step S11, the method proceeds to step S12 and decreases the transmit power level. In particular, if the near field magnetic induction transceiver of the first device 2 is configured to operate at a plurality of different transmit power levels differing by one or more discrete power values, the control circuit of the second device 2 may reduce the transmit power level of the near field magnetic induction transceiver of the second device 2 by one power level step.

The second device 2 may also communicate the decreased transmit power level or alternatively provide a command for reducing the transmit power level by a definite power value, for example a predefined power value step in a transmit signal to the second device 4.

Decreasing the power level in step S12 is performed under the assumption, that a transmit power level lower than the selected transmit power level is available for the first device 2.

After adapting (adjusting) the transmit power level in step S12, the method proceeds to step S15 and performs communication operation of the near field magnetic induction wireless link with the adjusted transmit power level.

The method may then return to step S10 for next cycle of the method.

If the determined link quality measure does not exceed the quality threshold in step S11 (NO in step S11), the method proceeds to step S13.

In step S13, the determined link quality measure is smaller than the quality threshold, the method proceeds to step S14 and increases the transmit power level. In particular, if the near field magnetic induction transceiver of the first device 2 is configured to operate at a plurality of different transmit power levels differing by one or more discrete power values, the control circuit of the second device 2 increases the transmit power level of the near field magnetic induction transceiver of the second device 2 by one power level step.

After adapting (adjusting) the transmit power level in step S14, the method proceeds to step S15 and performs communication operation of the near field magnetic induction wireless link with the adjusted transmit power level.

The method may then return to step S10 for next cycle of the method.

The second device 2 may also communicate the increased transmit power level or provide a command for increasing the transmit power level by a definite power value, for example a predefined power value step in a transmit signal to the second device 4.

Increasing the power level in step S12 is performed under the assumption, that a transmit power level smaller than the selected transmit power level is available for the first device 2. This will for example not be the case when the steps S10, S11, S13 and S14 are run in a first initial run after powering the hearing device system 1 up.

If the determined link quality measure does neither exceed the quality threshold in step S11 (NO in step S11), nor in step S13, the determined link quality measure is determined to be smaller than the quality threshold, the method directly proceeds to step S15 and continues communication operation with an adjusted power level which corresponds to the selected transmit power level with which the second device 2 entered the procedure of the steps S10 to S14. In this case, the adjusted transmit power level corresponds to a power level which ensures a minimum near field communication link quality at an advantageously low power consumption due to dynamically adapting the transmit power level to lowest possible transmit power value ensuring acceptable near field communication link quality.

Various embodiments of the advantageous hearing device system 1, its hearing aid device and the corresponding communication method are discussed above as illustrative examples.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A hearing device system comprising:
at least three devices, wherein the at least three devices are configured to communicate wirelessly via near field magnetic induction wireless link(s) based on a predetermined communication protocol;
wherein the predetermined communication protocol defines a frame comprising at least a first time slot and a second time slot;
wherein at least a first pair of devices of the at least three devices is configured to communicate in the first time slot, and at least a second pair of devices of the at least three devices is configured to communicate in the second time slot;
wherein the first pair of devices is configured to communicate in the first time slot with a first power level, and the second pair of devices is configured to communicate in the second time slot with a second power level which is different from the first power level; and
wherein the first pair of devices comprises a first hearing aid device and a second hearing aid device that are configured to communicate in the first time slot with the first power level, and the second pair of devices comprises the first hearing aid device and a first auxiliary device that are configured to communicate in the second time slot with the second power level.

2. The hearing device system according to claim 1, wherein a first device of the at least three devices comprises a control circuit; and
wherein the control circuit is configured to select the first power level and/or the second power level based on at least one of:
type identifiers of at least two other devices of the at least three devices, and
an evaluation of a quality of the near field magnetic induction wireless link(s) between the first device and each of the at least two other devices of the at least three devices.

3. The hearing device system according to claim 2, wherein the control circuit is configured to select the first power level and/or the second power level based on the evaluation of the quality of the near field magnetic induction wireless link(s) between the at least one first device and each of the at least two other devices of the at least three devices by computing qualities of respective communication signals received by the first device from respective ones of the at least two other devices via the near field magnetic induction wireless link(s).

4. The hearing device system according to claim 3, wherein the control circuit is configured to increase the first power level and/or the second power level if one of the computed qualities is below a predetermined minimum communication link quality.

5. The hearing device system according to claim 3, wherein the control circuit is configured to decrease the first power level and/or the second power level if one of the computed qualities exceeds a predetermined minimum communication link quality.

6. The hearing device system according to claim 3, wherein the control circuit is configured to evaluate the quality of the near field magnetic induction wireless link(s) by calculating at least one of a packet error rate and a bit error rate of the communication signal received by the first device from each of the at least two other devices.

7. The hearing device system according to claim 2, wherein the control circuit is configured to transmit first device type identifiers respectively to the at least two other devices in a pairing session via a first near field magnetic induction transceiver, the first device type identifiers identifying a first device type.

8. The hearing device system according to claim 7, wherein the control circuit is configured to control the first near field magnetic induction transceiver to transmit during the pairing session an inquiry signal or a beacon signal with the first power level; and
wherein the first power level is higher than the second transmit power level.

9. The hearing device system according to claim 8, wherein each of the at least two other devices of the at least three devices is configured to transmit a response signal comprising a second device type identifier for a second device type after receiving the inquiry signal and/or the beacon signal.

10. The hearing device according to claim 1, wherein at least one of the at least three devices comprises an external microphone arrangement.

11. The hearing device according to claim 1, wherein at least one of the at least three devices comprises a neck-worn microphone system, a wireless receiver, a mobile telephone interface, a battery charging device, a remote control interface, an induction loop interface, or a FM receiver device.

12. The hearing device system according to claim 1, wherein the first hearing aid device comprises a monaural hearing aid device.

13. The hearing device system according to claim 1, wherein a first distance $d_1$ between the first hearing aid device and the second hearing aid device of the first pair of devices is greater than a second distance $d_2$ between the first hearing aid device and the first auxiliary device of the second pair of devices, when the first and second hearing aids are at their respective operational positions with respect to a user, and wherein the first power level is greater than the second power level.

14. The hearing device system according to claim 1, further comprising a second auxiliary device, wherein a third pair of devices comprises the second hearing aid and the second auxiliary device, and wherein the third pair of devices is configured to communicate in the second time slot with a third power level which is different from the first power level, and each of the second and third power levels is smaller than the first power level.

15. A hearing aid device comprising:
a control circuit; and
a near field induction magnetic transceiver;
wherein the hearing aid device is configured to communicate via the near field induction magnetic transceiver according to a predetermined communication protocol;
wherein the predetermined communication protocol defines a frame comprising at least a first time slot and a second time slot;
wherein the control circuit is configured to control the near field induction magnetic transceiver to transmit a first transmission signal to a second device in the first time slot with a first transmit power level, and to transmit a second transmission signal to a third device in the second time slot with a second transmit power level different from the first transmit power level; and
wherein the second device is an additional hearing aid device, wherein the hearing aid device is configured to transmit the first transmission signal to the additional hearing aid device in the first time slot with the first transmit power level, wherein the third device comprises an auxiliary device, and wherein the hearing aid device is configured to transmit the second transmission signal to the auxiliary device in the second time slot with the second transmit power level.

16. A communication method for a hearing system comprising at least three devices, the at least three devices comprising at least two hearing aid devices, wherein the at least three devices are configured to communicate wirelessly via near field magnetic induction wireless link(s) based on a predetermined communication protocol;
wherein the predetermined communication protocol defines a frame comprising at least a first time slot and a second time slot;
the communication method comprising:
performing first communication between a first pair of devices of the at least three devices via the first time slot with a first power level, and
performing second communication between a second pair of devices of the at least three devices via the second time slot with a second power level which is different from the first power level;
wherein the first pair of devices comprises a first hearing aid device and a second hearing aid device that are configured to communicate in the first time slot with the first power level, and wherein the second pair of devices comprises the first hearing aid device and a first auxiliary device that are configured to communicate in the second time slot with the second power level.

* * * * *